United States Patent
Komatsu et al.

(10) Patent No.: US 8,948,257 B2
(45) Date of Patent: Feb. 3, 2015

(54) IMAGE ENCODING METHOD, IMAGE DECODING METHOD, IMAGE ENCODING APPARATUS, IMAGE DECODING APPARATUS, AND PROGRAM

(75) Inventors: Yuto Komatsu, Tachikawa (JP); Toru Yokoyama, Sagamihara (JP); Tomokazu Murakami, Kokubunji (JP); Shohei Saito, Matsudo (JP); Katsuyuki Nakamura, Saitama (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 549 days.

(21) Appl. No.: 12/895,005

(22) Filed: Sep. 30, 2010

(65) Prior Publication Data

US 2011/0080951 A1    Apr. 7, 2011

(30) Foreign Application Priority Data

Oct. 2, 2009   (JP) .................................. 2009-230954

(51) Int. Cl.
  *H04N 7/12*   (2006.01)
  *H04N 19/132*   (2014.01)
  *H04N 19/107*   (2014.01)
  *H04N 19/176*   (2014.01)
  *H04N 19/159*   (2014.01)

(52) U.S. Cl.
  CPC ..... *H04N 19/00127* (2013.01); *H04N 19/0003* (2013.01); *H04N 19/00278* (2013.01); *H04N 19/00218* (2013.01)
  USPC .................................................. 375/240.12

(58) Field of Classification Search
  USPC ........................................ 375/240.01, 240.12
  See application file for complete search history.

(56) References Cited

U.S. PATENT DOCUMENTS

| | | | |
|---|---|---|---|
| 2005/0041740 A1* | 2/2005 | Sekiguchi et al. | 375/240.16 |
| 2008/0159398 A1 | 7/2008 | Murakami et al. | |
| 2009/0154563 A1* | 6/2009 | Hong et al. | 375/240.16 |
| 2009/0180539 A1* | 7/2009 | Kudana et al. | 375/240.15 |
| 2010/0215101 A1* | 8/2010 | Jeon et al. | 375/240.12 |
| 2011/0090969 A1* | 4/2011 | Sung et al. | 375/240.25 |

FOREIGN PATENT DOCUMENTS

JP   2008-154015 A   7/2008

OTHER PUBLICATIONS

Shinya Kadono et al., H.264/AVC Textbook, Jan. 1, 2009, p. 125, Impress R & D, including partial translation (Two (2) pages).

* cited by examiner

*Primary Examiner* — Dave Czekaj
*Assistant Examiner* — Tracy Li
(74) *Attorney, Agent, or Firm* — Crowell & Moring LLP (57) ABSTRACT

A technique for improving a compression rate without needing new determination information (encoding flag information) is provided. For compression of each area to be encoded, based on a skip mode (a process which does not compress information of the area to be encoded, but copies previous information of the area to be encoded), it is determined whether an existing predicted image generated by an existing encoding standard is used, or an interpolation predicted image newly generated by executing move searching between decoded images is used.

7 Claims, 7 Drawing Sheets

IMAGE ENCODING METHOD, IMAGE DECODING METHOD, IMAGE ENCODING APPARATUS, IMAGE DECODING APPARATUS, AND PROGRAM

CLAIM OF PRIORITY

The present application claims priority from Japanese patent application JP 2009-230954 filed on Oct. 2, 2009, the content of which is hereby incorporated by reference into this application.

BACKGROUND OF THE INVENTION

1. Field of the Invention

The present invention relates to an image encoding method and an image encoding apparatus for efficiently reducing and encoding image data, an image decoding method and an image decoding apparatus, and a program.

2. Background Art

Conventionally, as a technique for image compression, international encoding standards, as represented by MPEG (Moving Picture Experts Group), are known. Further, to reduce image data, such a technique is known that improves a compression rate by concurrently using a technique for using an image generated by executing a move searching process between local decoded images in an encoding apparatus as a predicted image or a decoded image, and an existing encoding technique (for example, JP Patent Publication (Kokai) No. 2008-154015 A). More specifically, in JP Patent Publication (Kokai) No. 2008-154015 A, the predicted image generated according to the existing encoding standards, and the image generated by executing the move searching process between the local decoded images are encoded by being switched for every pixel block, and thereby, the compression rate is improved.

However, in the method showed by JP Patent Publication (Kokai) No. 2008-154015 A, that is, the method by which the predicted image generated according to the existing encoding standards, and the image newly generated by executing the move searching process between the decoded images are encoded by being switched for every block, determination information (flag information) on which image is to be used newly becomes necessary in addition to existing flag information. Thus, encoding quantity for the determination information becomes large in some input video image, so that the compression rate when the compression is executed by the method of JP Patent Publication (Kokai) No. 2008-154015 A may become lower than the compression rate when the compression is executed according to the conventional standards.

The present invention is made in consideration of such condition, and provides a technique for improving the compression rate without needing the new determination information.

SUMMARY OF THE INVENTION

To resolve the above problem, in the present invention, based on a skip mode (skipped macroblock) which is already defined as encoding information (flag) of H.264/AVC, any one of the existing predicted image (in-screen or between-screen predicted image) generated by the existing method, and an interpolation predicted image generated by interpolation prediction is selected, and the selected image is used as the predicted image.

That is, in the present invention, when the image is encoded and is transmitted, first, difference data between the predicted image for the image to be encoded, and the image to be encoded is generated. Next, the difference data is encoded, and encoded image data is generated and is outputted. When the predicted image is generated, based on skip mode information associated with the image to be encoded, one of the in-screen or between-screen predicted image, and the interpolation predicted image generated by executing the move searching between the local decoded images is outputted as the predicted image. Meanwhile, when the predicted image is generated, the image to be encoded is a B picture, and only in an area to be encoded in which the skip mode of the B picture is valid, the process is controlled so that the above interpolation predicted image is outputted as the above predicted image. When the image to be encoded is a P picture, the process is controlled so that the in-screen or between-screen predicted image is outputted as the predicted image.

On the other hand, when the encoded image data is decoded, and decoded image data is generated, first, the encoded image data is syntax-analyzed, and is at least separated to the encoded image data to be decoded, and the encoding information which includes the skip mode information, and is necessary for the decoding, the encoded image data to be decoded is decode, and prediction error data is generated. Further, the decoded image is generated by adding the prediction error data and the predicted image. When the predicted image is generated, based on the skip mode information, one of the in-screen or between-screen predicted image, and the interpolation predicted image generated by executing the move searching between the decoded images is outputted as the predicted image.

Further characteristics of the present invention will become apparent in the best mode for carrying out the present invention, and the attached drawings.

According to the present invention, it becomes possible to record and transmit a video signal in encoding quantity which is less than that of the conventional method.

DESCRIPTION OF SYMBOLS

101 Video image input unit
102 Area dividing unit
103 Encoding unit
104 Variable length-encoding unit 201, 801 Subtractor
202, 802 Frequency-transforming/quantizing unit
203, 503, 803 Reverse-quantizing/reverse-frequency transforming unit
204, 504, 804 Adder
205, 505, 805 Decoded image storing unit
206, 806 In-screen predicting unit
207, 807 Between-screen predicting unit
208, 808 In-screen/between-screen predicted image selecting unit
209, 809, 508 Decoded image move searching unit
210, 509 Interpolation predicted image generating unit
211, 507 Interpolation predicted image determining unit
501 Variable length-decoding unit
502 Syntax-analyzing unit
506 Predicted image generating unit
510 Video image display apparatus

DETAILED DESCRIPTION OF THE PREFERRED EMBODIMENTS

The present invention is related to an image encoding apparatus realizing the encoding without transmitting a flag (determination information) indicating a predicted image generating method (which of an existing (in-screen/between-screen) predicted image and an interpolation predicted image is used as a predicted image), and an image decoding apparatus decoding the image encoded without using the flag. Particularly, the present invention is appropriate for the encoding and the decoding which are for example compliant with H.264/AVC standard.

Hereinafter, embodiments of the present invention will be described by referring to the attached drawings. However, the present embodiments are just examples for realizing the present invention, so that it is to be noted that the technical scope of the present invention is not limited. The same reference numerical is attached to a component which is common in each drawing.

(1) First Embodiment

Whole Configuration of the Image Encoding Apparatus

Figure 1:
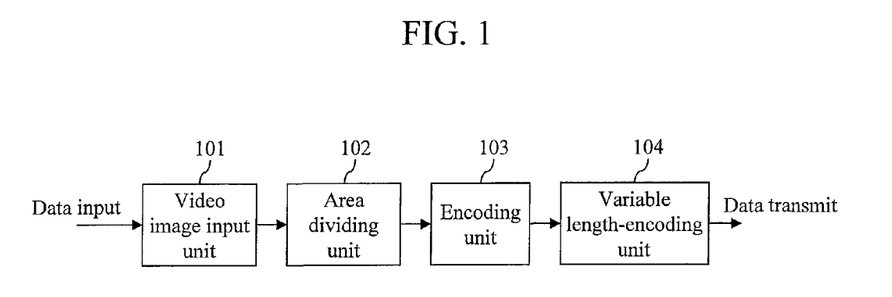
FIG. 1 is a diagram illustrating a schematic configuration of an image encoding apparatus according to an embodiment of the present invention.

FIG. 1 is a diagram illustrating a schematic configuration of the image encoding apparatus according to an embodiment of the present invention. Reference numeral 101 denotes a video image input unit which stores an input image. Reference numeral 102 denotes an area dividing unit which divides the input image into the areas to be encoded (for example, macroblocks or slices). Reference numeral 103 denotes an encoding unit which encodes input image data divided by the area dividing unit by an encoding unit, and locally-decodes the encoded data. Reference numeral 104 denotes a variable length encoding unit which variable length-encodes the data encoded by the encoding unit 103. Hereinafter, each processing unit of the present embodiment will be described in detail.

The video image input unit 101 rearranges the input image in order of the encoding. The rearranging in order of the encoding is executed depending on whether a picture is an in-screen predicted picture (I picture), a single direction predicted picture (P picture), or a bi-direction predicted picture (B picture), and thereby, an arranging order of an image group (for example, GOP) is changed from a displaying order to an encoding order.

Next, the area dividing unit 102 divides a frame to be encoded to the area to be encoded. A shape of an area to be divided may be a block unit (for example, the macroblock unit or the slice unit) like a square area or a rectangle area, or an object unit extracted by using a method like the watershed method. A size of the area to be divided may be from a size adopted by an existing encoding standard like 16×16 pixels, or a large size such as 64×64 pixels. The image divided by the area dividing unit 102 is transmitted to the encoding unit 103.

<Detailed Configuration of the Encoding Unit>

Figure 2:
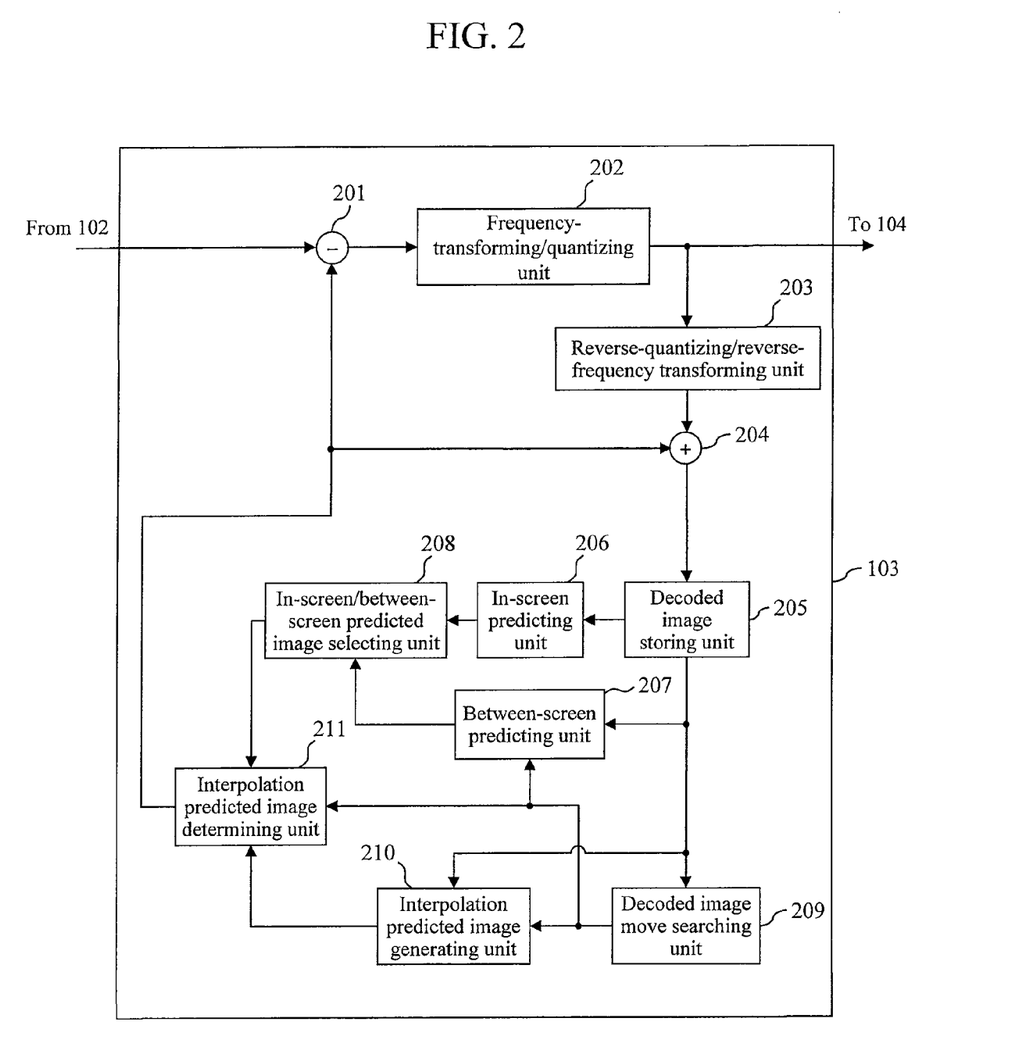
FIG. 2 is a diagram illustrating a detailed configuration of an encoding unit according to a first embodiment of the present invention.

FIG. 2 is a diagram illustrating a more detailed configuration of the encoding unit 103. Reference numeral 201 denotes a subtractor which calculates a difference between the image divided by the area dividing unit 102 and the image (a local decoded image, and any one of the predicted image of the area to be encoded area: the in-screen/between-screen predicted image and the interpolation predicted image) determined by an interpolation predicted image determining unit 211, and outputs a residual error (predicted error data).

Reference numeral 202 denotes a frequency-transforming/quantizing unit which frequency-transforms difference data outputted by the subtractor 201, and quantizes the frequency-transformed data. Reference numeral 203 denotes a reverse-quantizing/reverse-frequency transforming unit which reverse-quantizes the data outputted by the frequency-transforming/quantizing unit 202, and reverse-frequency transforms the reverse-quantized data.

Reference numeral 204 denotes an adder which adds the data outputted by the reverse-quantizing/reverse-frequency transforming unit 203, and the image determinate by the interpolation predicted image determining unit 211, and outputs the decoded image. Reference numeral 205 denotes a decoded image storing unit which stores the data (decoded image) outputted by the adder 204.

Reference numeral 209 denotes a decoded image move searching unit which detects an area which is most approximate between the decoded images stored in the decoded image storing unit 205, and outputs move information.

Reference numeral 206 denotes an in-screen predicting unit which generates the predicted image from a peripheral image of the area in the same frame as that of the area to be encoded. Reference numeral 207 denotes a between-screen predicting unit which detects the image, which is close to the image of the area to be encoded, from the area in the frame, which is different from the frame to which the area to be encoded belongs, executes move compensation by using the move information obtained by the decoded image move searching unit 209, and generates the predicted image. Reference numeral 208 denotes an in-screen/between-screen predicted image selecting unit which selects the image whose encoding rate is higher in the in-screen predicted image and the between-screen predicted image (for example, select a predicting method of less encoding quantity), and outputs the selected predicted image as the existing predicted image.

Reference numeral 210 denotes an interpolation predicted image generating unit which generates an interpolation image based on the move information detected by the decoded image move searching unit 209. Reference numeral 211 denotes an interpolation predicted image determining unit which determines which is used the image (interpolation predicted image) generated by the interpolation predicted image generating unit 210, or the predicted image (existing predicted image) generated by the in-screen/between-screen predicted image selecting unit 208. The interpolation predicted image is selected when the image to be encoded is the B picture, and a skip mode of the area to be encoded is valid. That is, the interpolation predicted image determining unit 211 determines based on skip mode information to select which of the existing predicted image and the interpolation predicted image to select as the image in which a difference from the image to be encoded is to be obtained.

Next, the detail of each processing unit of the encoding unit 103 will be described. The frequency-transforming/quantizing unit 202 frequency-transforms a difference image between the image to be encoded and the generated predicted image by using, for example, DCT (Discrete Cosine Transform), wavelet transform, or the like, and quantizes a coefficient after the frequency-transforming. The data after the quantizing is transmitted to the variable length-encoding unit 104 and the reverse-quantizing/reverse-frequency transforming unit 203.

The reverse-quantizing/reverse-frequency transforming unit 203 executes a reverse-process of the process executed by the frequency-transforming/quantizing unit 202. That is, the data inputted to the reverse-quantizing/reverse-frequency transforming unit 203 is reverse-quantized, the reverse-quantized data is reverse-frequency transformed by reverse-DCT, reverse-wavelet transform, or the like, and the image corresponding to the above difference image (predicted error data) is generated.

The adder 204 adds the image corresponding to the difference image outputted from the reverse-quantizing/reverse-frequency transforming unit 203, and the predicted image determined by the interpolation predicted image determining unit 211, and generates the local decoded image. The generated local decoded image is stored in the decoded image storing unit 205.

The in-screen predicting unit 206 generates the predicted image by using the decoded peripheral image of the area to be encoded stored in the decoded image storing unit 205. The between-screen predicting unit 207 detects, by a matching process, the area in which the inputted image data of the area to be encoded, and the image data of the image area in the decoded frame stored in the decoded image storing unit 205 are most approximate to each other, and the detected area is used as the predicted image.

The decoded image stored in the decoded image storing unit 205 is also transmitted to the decoded image move searching unit 209. The decoded image move searching unit 209 executes the following process.

Figure 3:
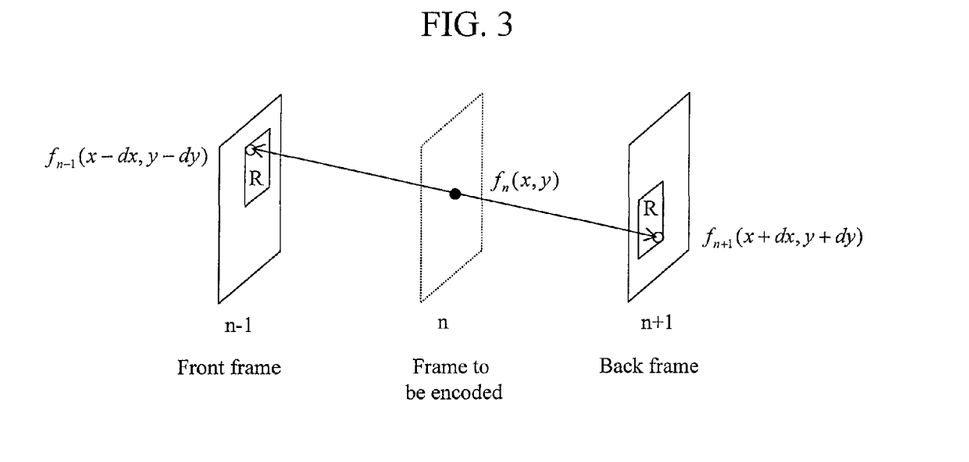
FIG. 3 is a diagram illustrating the relation between a frame to be encoded, and front and back frames.

First, as illustrated in FIG. 3, a predicted error absolute value sum $SAD_n(x, y)$ indicated by Formula (1) is obtained by using pixels $f_{n-1}(x-dx, y-dy)$ and $f_{n+1}(x+dx, y+dy)$ in the front and back frames of the frames "n" to be encoded (n is a natural number indicating a encoding order). Here, "R" is an area size in the case of the move searching, and "m" is an offset for improving the accuracy of the move searching.

[Formula 1]

$$SAD_n(x, y) = \sum_{n,m \in R} |f_{n-1}(x-dx+n, y-dy+m) - f_{n+1}(x+dx+n, y+dy+m)| \quad (1)$$

Next, a coordinate (dx, dy) in the move searching area R in which $SAD_n(x, y)$ of Formula (1) becomes minimum is obtained, and a move vector is determined. For the move searching, an example of whole searching is described here, however, a simplified move searching method may be used to reduce a processing quantity.

The interpolation predicted image generating unit 210 generates the interpolation predicted image by the following method. That is, the interpolation predicted image generating unit 210 generates the pixel $f_n(x, y)$ of the area to be encoded from the pixels $f_{n-1}(x-dx, y-dy)$ and $f_{n+1}(x+dx, y+dy)$ in the front and back encoded frames of the frame to be encoded as indicated by Formula (2), by using the move vector obtained by the decoded image move searching unit 209.

[Formula 2]

$$f_n(x, y) = \frac{f_{n-1}(x-dx, y-dy) + f_{n+1}(x+dx, y+dy)}{2} \quad (2)$$

When the area to be encoded is the macro block of 16×16 pixels, the interpolation predicted image of the area to be encoded is expressed by Formula (3).

$$\sum_{x=0}^{16} \sum_{y=0}^{16} f_n(x, y) \quad (3)$$

Next, the interpolation predicted image determining unit 211 determines which is the predicted image, the interpolation predicted image or the existing predicted image based on whether or not a skip mode flag added to the encoding unit (for example, macroblock) is valid. When the skip mode is valid, the interpolation predicted image is selected, and when the skip mode is invalid, the existing predicted image is selected. Meanwhile, this skip mode is a mode used only when the frame to be encoded is the B picture, and is supported by the standards of MPEG4 and H.264/AVC (refer to [Revision 3 H, 264/AVC textbook], issued Jan. 1, 2009, Impress R&D, p. 125 (skipped macroblock)). Thus, when the image to be encoded is the P picture, the existing predicted image constantly becomes the predicted image. As described above, the existing flag is used for determining whether or not the interpolation image is used as the predicted image, so that it is not necessary to set, multiplex, and transmit the new determination information (flag). Thus, it becomes possible to enjoy the maximum advantage for using the interpolation predicted image. Meanwhile, the image data of the area to be encoded is inputted to the encoding unit 103 as associated with the skip mode information. Thus, the skip mode information may be added to the image data to be inputted to the encoding unit 103, or the skip mode information may be separated from the image data of the area to be encoded by the area dividing unit 102, and may be provided to the interpolation predicted image determining unit 211.

Figure 4:
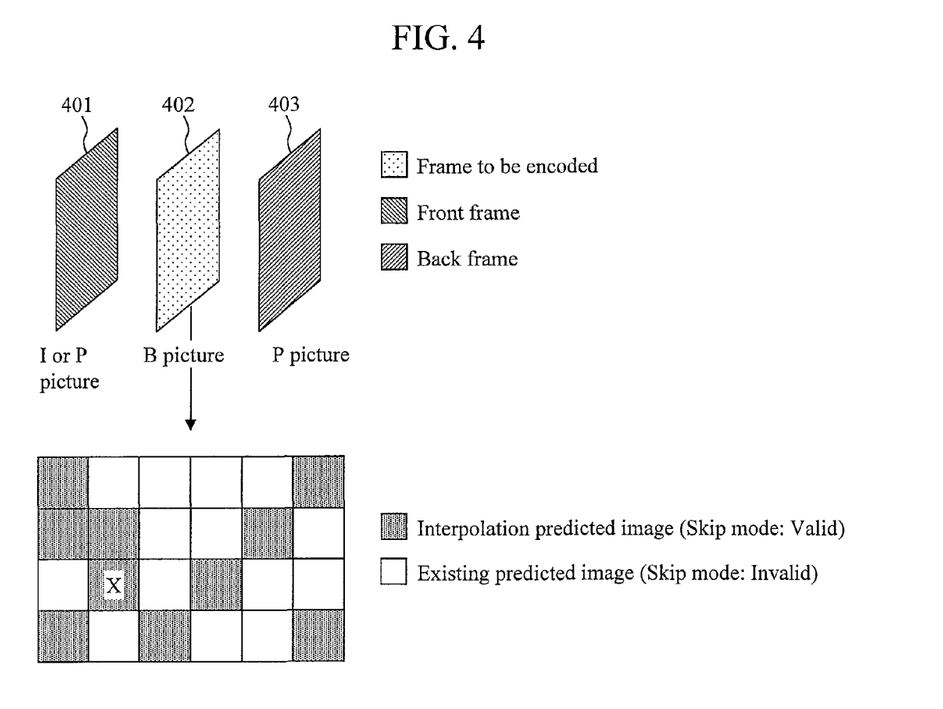
FIG. 4 is a diagram illustrating an exemplary frame when an interpolation predicted image and an existing predicted image are mixed.

FIG. 4 is a diagram illustrating an exemplary frame, which is provided to more deepen the understanding for selecting the predicted image, and when the interpolation predicted image and the existing predicted image are mixed. Here, by using FIG. 4, the process of the interpolation predicted image determining unit 211 will be described in detail.

First, when it is assumed that the area to be encoded is X, and when the skip mode is selected in X (the skip mode is valid), the interpolation predicted image is used as the predicted image. On the other hand, when the skip mode is not selected in X, the existing predicted image is used as the predicted image. Because, on the existing standards (for example, MPEG, or the like), the move vector of the area to be encoded is predicted by using the move vector of an anchor area, so that when the encoding mode is in-screen predicted, the move vector of the anchor area becomes "0", and the prediction accuracy of the move vector is degraded. Thus, it becomes more advantageous to select the interpolation predicted image generated by using the move vector obtained by executing the move searching between the decoded images.

Meanwhile, on the above description, after the existing predicted image and the interpolation predicted image are generated, the interpolation predicted image determining unit 211 determines based on the skip mode information which is selected as the predicted image for residual generation, however, another case may be available. For example, the in-screen predicting unit 206 and the between-screen predicting unit 207 may operate when the skip mode information of the area to be encoded is invalid, and the interpolation predicted image generating unit 210 may operate when the skip mode information of the area to be encoded is valid. In this case, the operation of the interpolation predicted image determining unit 211 becomes simpler. Thereby, it becomes unnecessary to generate both of the existing predicted image and the interpolation predicted image in all of the areas to be encoded, so that it becomes possible to reduce calculation load in an encoding apparatus.

<Configuration of a Decoding Apparatus>

Figure 5:
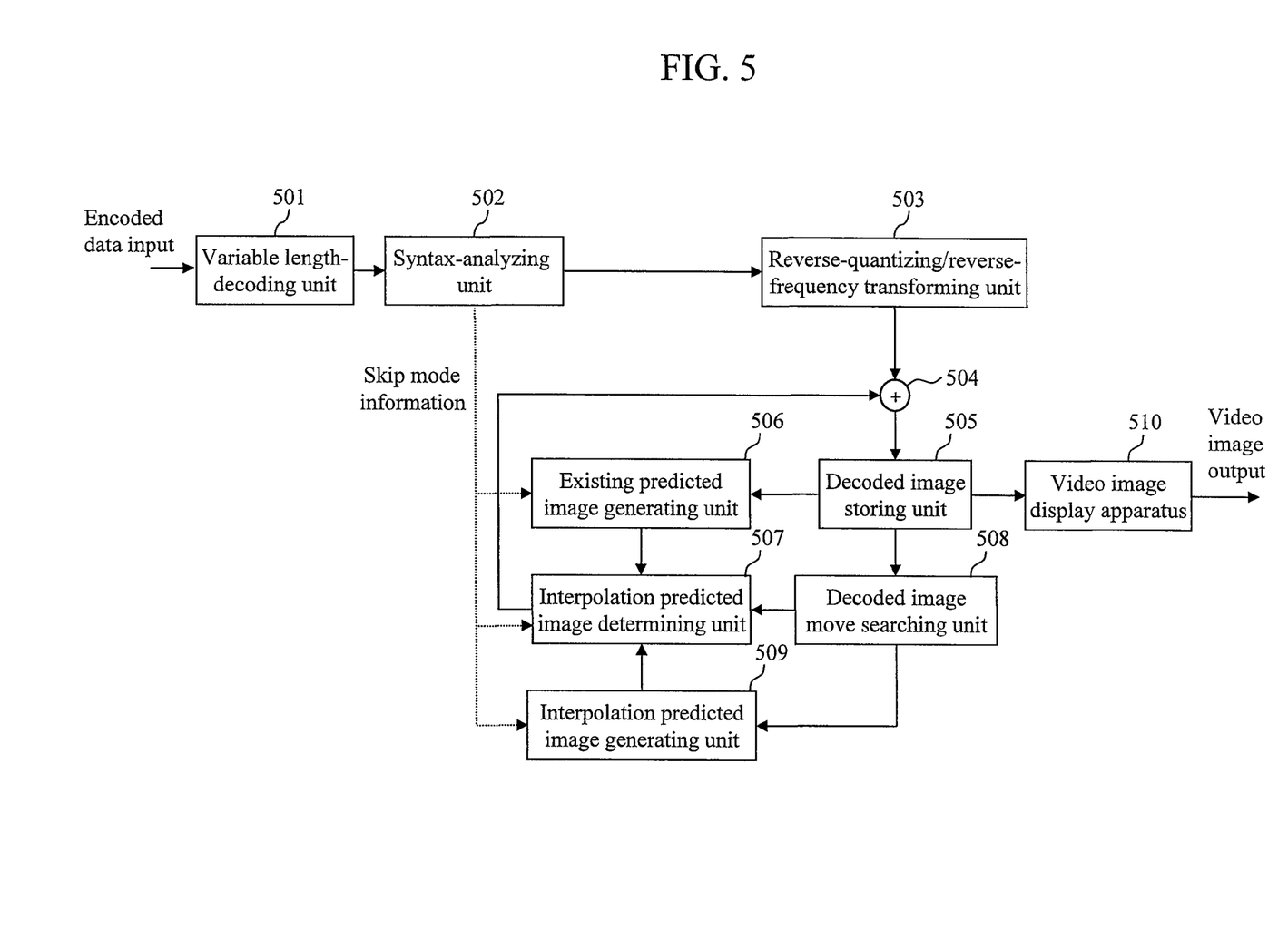
FIG. 5 is a diagram illustrating a schematic configuration of a decoding apparatus according to the embodiment of the present invention.

Hereinafter, a decoding apparatus, which decodes data encoded by the above encoding apparatus, will be described. FIG. 5 is a diagram illustrating a schematic configuration of the decoding apparatus according to the embodiment of the present invention.

In FIG. 5, Reference numeral 501 denotes a variable length-decoding unit which decodes encoded data transmitted from an encoding side. Reference numeral 502 denotes a syntax-analyzing unit which syntax-analyzes the variable length-decoded data. Because of this syntax-analyzing, it becomes possible to comprehend what information is included in what part, such as a header part, and image data part of the transmitted data.

Reference numeral 503 denotes a reverse-quantizing/reverse-frequency transforming unit which reverse-quantizes and reverse-frequency transforms the data transmitted by the syntax-analyzing unit 502. Reference numeral 504 denotes an adder which adds the data outputted by the reverse-quantizing/reverse-frequency transforming unit 503, and the predicted image data outputted by an interpolation predicted image determining unit 507, and generates the decoded image. Reference numeral 505 denotes a decoded image storing unit which stores the data outputted by the adder 504.

Reference numeral 506 denotes an existing predicted image generating unit which generates the predicted image by using the image stored in the decoded image storing unit 505 based on encoding mode information transmitted by the syntax-analyzing unit 502. Reference numeral 507 denotes an interpolation predicted image determining unit which determines which is used, the predicted image generated by the existing predicted image generating unit 506, or the image generated by a interpolation predicted image generating unit 509. Reference numeral 508 denotes a decoded image move searching unit which detects the area which is most approximate between the decoded images stored in the decoded image storing unit 505. Reference numeral 509 denotes an interpolation predicted image generating unit which generates the interpolation image based on the move information detected by the decoded image move searching unit 508. Reference numeral 510 denotes a video image display apparatus which displays the decoded image stored in the decoded image storing unit 505.

<Detail of a Decoding Process>

Figure 6:
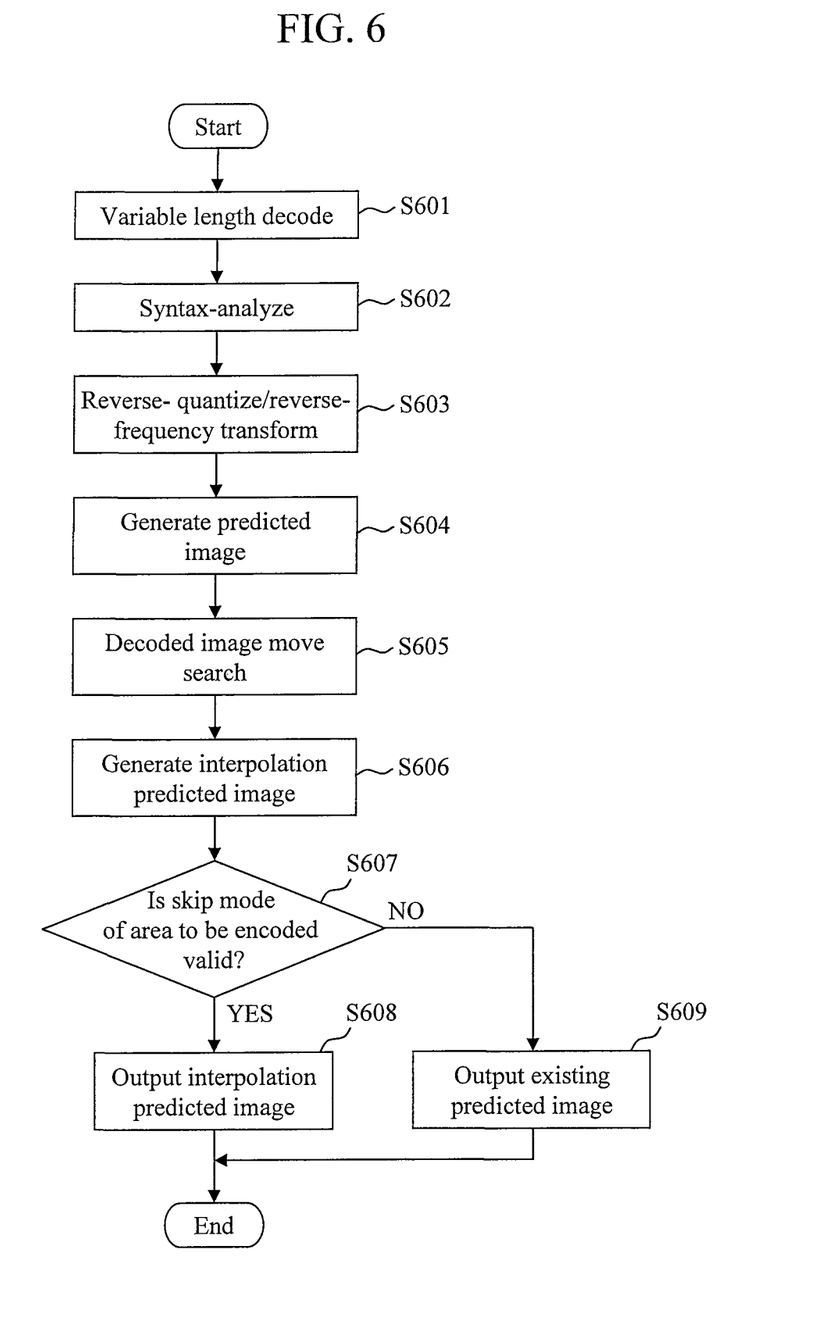
FIG. 6 is a flowchart describing the detail of a decoding process.

Hereinafter, the detail of the decoding process will be described by using FIG. 6. FIG. 6 is a flowchart describing the detail of the decoding process.

In FIG. 6, first, the variable length-decoding unit 501 variable length-decodes the received encoded data, and transmits the variable length-decoded data to the syntax-analyzing unit 502 (S601). Next, the syntax-analyzing unit 502 executes syntax-separating of decoded stream data to separate each data, provides the predicted error data in the separated data to the reverse-quantizing/reverse-frequency transforming unit 503, and transmits move vector information to the existing predicted image generating unit 506 and the interpolation predicted image determining unit 507 (S602). The reverse-quantizing/reverse-frequency transforming unit 503 reverse-quantizes the predicted error data, and executes a reverse-frequency transforming process (for example, the reverse-DCT transform, the reverse-wavelet transform, and the like (however, some process corresponding to a transforming method of the encoding apparatus)) for the reverse-quantized data (S603).

The existing predicted image generating unit 506 generates the in-screen predicted image or the between-screen predicted image by a method of the existing encoding standard (S604). The decoded image move searching unit 508 executes the move searching process by the same method as the process of the decoded image move searching unit 209 of the encoding side (S605). Further, the interpolation predicted image generating unit 509 generates the interpolation image by the same method as the interpolation predicted image generating unit 210 of the encoding side (S606).

Next, the interpolation predicted image determining unit 507 determines which is used, the interpolation predicted image or the existing predicted image by the same method as the process of the interpolation predicted image determining unit 211 of the encoding side (S607). That is, when the skip mode is valid in the area to be encoded (YES at S607), the interpolation predicted image determining unit 507 is controlled so as to output the interpolation predicted image as the predicted image.

When it is determined that the interpolation predicted image is used as the predicted image of the corresponding area to be encoded (YES at S607), the interpolation predicted image determining unit 507 outputs the interpolation predicted image, and the decoded image is generated based on the outputted interpolation predicted image (S608). On the other hand, when it is determined that the existing predicted image is used as the predicted image of the corresponding area to be encoded, the interpolation predicted image determining unit 507 outputs the existing predicted image, and the decoded image is generated based on the outputted existing predicted image (S609). This decoded image is finally outputted by the video image display apparatus 510.

Figure 7:
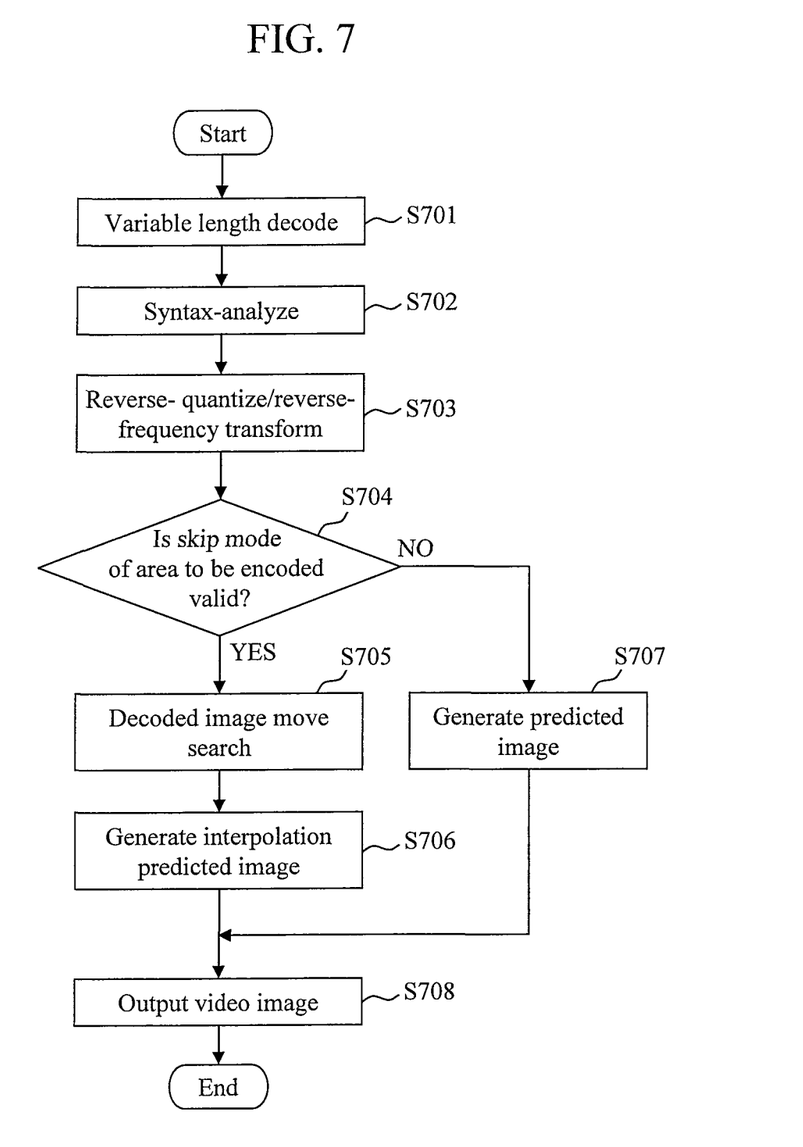
FIG. 7 is a flowchart describing the detail of the decoding process as a modified example.

Meanwhile, in the process based on FIG. 6, after the existing predicted image and the interpolation predicted image are generated, it is determined based on the skip mode information which is selected, however, as the process based on FIG. 7, when the skip mode is valid in the image of the area to be encoded, the interpolation predicted image may be generated. Thereby, it is enough to generate the interpolation predicted image only when it is necessary, so that it is advantageous that calculation quantity is small.

As described above, according to the present embodiment, it becomes unnecessary to transmit new information (new determination flag) for determining whether the area to be encoded is the interpolation predicted image or the existing predicted image, and it becomes possible to improve the compression rate as compared with the existing encoding standard.

(2) Second Embodiment

In the second embodiment, a normal encoding method, which is compliant with H.264/AVC, is adopted in the encoding unit 103 of the first embodiment. That is, the interpolation predicted image generating unit 210 and the interpolation predicted image determining unit 211 are omitted from the configuration of FIG. 2. Hereinafter, the encoding unit 103 will be described by using FIG. 8. Meanwhile, the configuration of the decoding apparatus according to the present embodiment is the same as that of the first embodiment, so that the description will be omitted.

Figure 8:
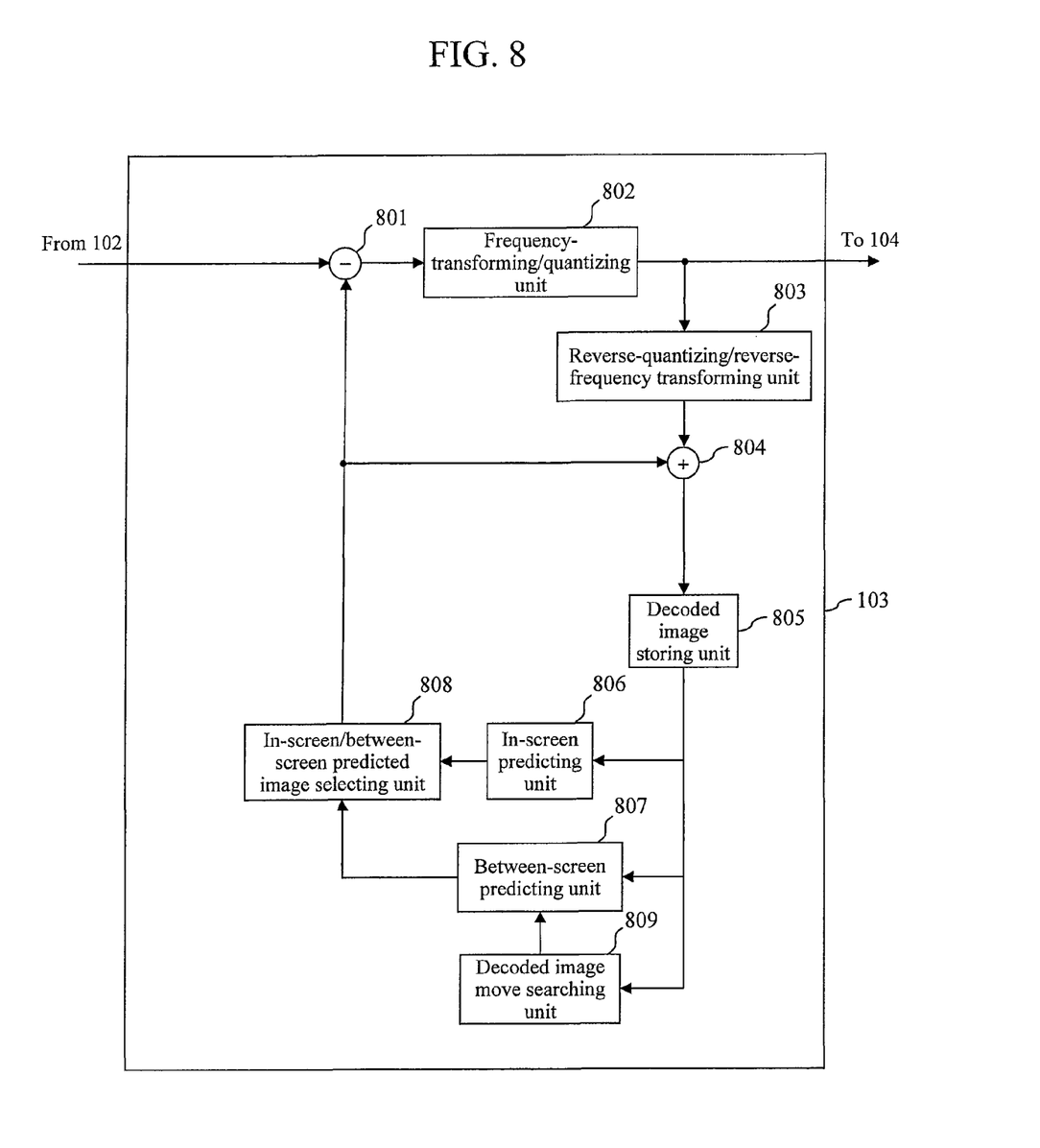
FIG. 8 is a diagram illustrating a detailed configuration of the encoding unit according to a second embodiment of the present invention.

FIG. 8 is a diagram illustrating a configuration of the encoding unit according to the second embodiment. In FIG. 8, Reference numeral 801 denotes a subtractor which calculates a difference between the image divided by the area dividing unit 102, and the image determined as the predicted image by an in-screen/between-screen predicted image selecting unit 808. Reference numeral 802 denotes a frequency-transforming/quantizing unit which frequency-transforms and quantizes the difference data outputted by the subtractor 801. Reference numeral 803 denotes a reverse-quantizing/reverse-frequency transforming unit which reverse-quantizes and reverse-frequency transforms the data outputted by the frequency-transforming/quantizing unit 802.

Reference numeral 804 denotes an adder which adds the data outputted by the reverse-quantizing/reverse-frequency transforming unit 803 and the image which is selected as the predicted image by the in-screen/between-screen predicted image selecting unit 808. Reference numeral 805 denotes an decoded image storing unit which stores the data outputted by the adder 804.

Reference numeral 806 denotes an in-screen predicting unit which generates the predicted image from the peripheral image of the area to be encoded. Reference numeral 807 denotes a between-screen predicting unit which detects the image which is close to the area to be encoded from the area in the frame which is different from the frame to be encoded, and uses the detected image as the predicted image. Reference numeral 808 denotes an in-screen/between-screen predicted image selecting unit which selects the image whose encoding rate is higher (encoding quantity is less) in the in-screen predicted image and the between-screen predicted image. Reference numeral 809 denotes a decoded image move searching unit which detects the area which is most approximate between the decoded images stored in the decoded image storing unit 805.

Next, each processing unit of the encoding unit 103 will be described in detail. The frequency-transforming/quantizing unit 802, for example, frequency-transforms the difference image by using DCT (Discrete Cosine Transform), the wavelet transform, or the like, and quantizes the frequency-transformed coefficient. The quantized data is transmitted to the variable length-encoding unit 104 and the reverse-quantizing/reverse-frequency transforming unit 803. The reverse-quantizing/reverse-frequency transforming unit 803 executes the reverse process of the process executed by the frequency-transforming/quantizing unit 802.

The adder 804 adds the predicted image outputted by the in-screen/between-screen predicted image selecting unit 808, and the data outputted by the reverse-quantizing/reverse-frequency transforming unit 803, and generates the local decoded image. The generated local decoded image is stored in the decoded image storing unit 805.

The in-screen predicting unit 806 generates the predicted image by using the peripheral image of the decoded area to be encoded, which is stored in the decoded image storing unit 805. The between-screen predicting unit 807 detects by a matching process the area in which the inputted area to be encoded, and the image area in the decoded frame stored in the decoded image storing unit 805 are most approximate to each other, and the detected area is used as the predicted image.

The decoded image stored in the decoded image storing unit 805 is transmitted to the decoded image move searching unit 809. The decoded image move searching unit 809 obtains the predicted error absolute value sum $SAD_n$ (x, y) from the Formula (1) described in the first embodiment, obtains a coordinate (dx, dy) in the move searching area R in which the obtained $SAD_n$ (x, y) becomes minimum, and determines the move vector. For the move searching, an example of whole searching is described here, however, a simplified move searching method may be used to reduce a processing quantity.

As described above, in the encoding/decoding apparatus according to the second embodiment, it becomes unnecessary to transmit information for determining whether the area to be encoded is the interpolation predicted image or the existing predicted image, so that the compression rate can be improved more than the existing encoding standard. In the encoding apparatus according to the present embodiment, it becomes unnecessary to determine whether the area to be encoded is the interpolation predicted image or the existing predicted image, so that the calculation quantity/processing time can be reduced more than the first embodiment.

(3) Summary

In the present invention, based on the skip mode (skipped macroblock) which is already defined as the encoding information (flag) of H.264/AVC, one of the existing predicted image generated by the existing method (in-screen or between-screen predicted image), and the interpolation predicted image generated by the interpolation predicting is selected to be used as the predicted image. The skip mode becomes valid only when the image to be encoded is the B picture, and only for the area to be encoded (macroblock), in which the skip mode of the corresponding B picture is valid, the interpolation predicted image is outputted as the predicted image. When the image to be encoded is the P picture, the in-screen or between-screen predicted image is outputted as the predicted image. As described above, the image to be used as the predicted image is determined by using the encoding information which is already defined on the standard, so that it becomes unnecessary to newly set and transmit determination flag information for the corresponding determination. The encoding quantity of each determination flag information is not large, however, the accumulated determination flag information becomes huge, so that, because the new determination information is not transmitted, the advantage for improving the compression rate is great.

On the other hand, when the transmitted encoded image data is decoded, and the decoded image data is generated, and when the predicted image for generating the decoded image by adding the predicted error data is generated, based on the skip mode information, one of the in-screen or between-screen predicted image, and the interpolation predicted image generated by executing the move searching between the existing decoded images is outputted as the predicted image. Even when the interpolation predicted image is not used as the predicted image in the side of the encoding apparatus, any one of the existing predicted image and the interpolation predicted image is used as the predicted image in the side of the encoding apparatus, so that it is possible to determine which is selected based on the skip mode (the above description corresponds to the second embodiment). Thus, it becomes possible to efficiently execute the image decoding process.

Meanwhile, the present invention can be implemented by a program code of software which realizes functions of the embodiment. In this case, a storage medium, in which the program code is recorded, is provided to a system or an apparatus, and a computer (or, a CPU or an MPU) of the system or the apparatus reads out the program code stored in the storage medium. In this case, the program code itself read out from the storage medium realizes the above-described functions of the embodiment, so that the program code itself, and the storage medium storing the program code compose the present invention. The followings are, for example, used as the storage medium for delivering such a program code: floppy (trade mark) disk, CD-ROM, DVD-ROM, hard disk, optical disk, magnetic optical disk, CD-R, magnetic tape, nonvolatile memory card, and ROM.

Based on an instruction of the program code, an OS (operating system) or the like operating on the computer executes a part or all of the actual process, and the above-described functions of the embodiment may be realized by the process. Further, after the program code read out from the storage medium is written in a memory on the computer, based on the instruction of the program code, the CPU or the like of the computer executes a part or all of the actual process, and the above-described functions of the embodiment may be realized by the process.

The program code of the software for realizing the functions of the embodiment is delivered through a network such as the Internet, thereby, the delivered program code is downloaded, and is stored in a storage unit such as the hard disk or the memory of the system or the apparatus, or the storage medium such as the CD-ROM and the CD-R, and when the stored program code is used, the computer (or, the CPU or the MPU) of the system or the apparatus may read out the program code stored in the corresponding storage unit or the corresponding storage medium, and may execute the read out program code.

What is claimed is:

1. An image encoding method of encoding image data, and outputting encoded image data, comprising:
   a step of generating difference data between a predicted image for an image to be encoded and the image to be encoded;
   a step of encoding the difference data and generating the encoded image data, and outputting the generated encoded image data;
   a step of decoding the encoded image data, and generating a local decoded image;
   a step of generating the predicted image by using the local decoded image; and
   a step of outputting, using a predicted image generating part of an image decoding apparatus, one of an in-screen or between-screen predicted image, and an interpolation predicted image generated by executing move searching between the local decoded images as the predicted image based on a skip mode that includes information associated with the image to be encoded, the skip mode being a process in which previous information of a frame is copied and in which data of a pixel block is not compressed, wherein the step of outputting comprises:
      when the skip mode is valid, outputting the interpolation predicted image as the predicted image, such that the interpolation predicted image is used for compression of every pixel block to be encoded; and
      when the skip mode is invalid, outputting the in-screen or between-screen predicted image as the predicted image, such that the in-screen and between-screen predicted image are encoded by being switched for every pixel.

2. The image encoding method according to claim 1, wherein, at the step of generating the predicted image, the image to be encoded is a B picture, and only in an area to be encoded in which the skip mode of the B picture is valid, the interpolation predicted image is outputted as the predicted image.

3. The image encoding method according to claim 2, wherein, at the step of generating the predicted image, when the image to be encoded is a P picture, the in-screen or between-screen predicted image is outputted as the predicted image.

4. An image decoding method of decoding transmitted encoded image data, and outputting decoded image data, comprising:
   a step of syntax-analyzing the encoded image data, and separating the encoded image data into at least the encoded image data to be decoded, and encoding information which includes information in a skip mode and is necessary to decode, the skip mode being a process in which previous information of a frame is copied and in which data of a pixel block is not compressed;
   a step of decoding the encoded image data to be decoded, and generating predicted error data;
   a step of adding the predicted error data and a predicted image and generating a decoded image, and outputting the generated decoded image;
   a step of generating the predicted image by using an existing decoded image; and
   a step of outputting, using a predicted image generating part of an image decoding apparatus, one of an in-screen or between-screen predicted image and an interpolation predicted image generated by executing move searching between the existing decoded images as the predicted image based on the skip mode information, wherein the step of outputting comprises:
      when the skip mode is valid, outputting the interpolation predicted image as the predicted image, such that the interpolation predicted image is used for compression of every pixel block to be encoded; and
      when the skip mode is invalid, outputting the in-screen or between-screen predicted image as the predicted image, such that the in-screen and between-screen predicted image are encoded by being switched for every pixel.

5. The image decoding method according to claim 4, wherein, at the step of generating the predicted image, the encoded image data to be decoded is a B picture, and only in an area to be encoded in which the skip mode of the B picture is valid, the interpolation predicted image is outputted as the predicted image.

6. The image decoding method according to claim 5, wherein, at the step of generating the predicted image, when the encoded image data to be decoded is a P picture, the in-screen or between-screen predicted image is outputted as the predicted image.

7. An image decoding apparatus decoding transmitted encoded image data, and outputting decoded image data, comprising:
   a syntax-analyzing part which syntax-analyzes the encoded image data, and separates the encoded image data into at least the encoded image data to be decoded, and encoding information which includes information in a skip mode and is necessary to decode, the skip mode being a process in which previous information of a frame is copied and in which data of a pixel block is not compressed;
a decoding processing part which decodes the encoded image data to be decoded, and generates predicted error data;
a decoded image generating part which adds the predicted error data and a predicted image and generates a decoded image, and outputs the generated decoded image; and
a predicted image generating part which generates the predicted image by using an existing decoded image, wherein:
the predicted image generating part outputs one of an in-screen or between-screen predicted image and an interpolation predicted image generated by executing move searching between the existing decoded images as the predicted image based on the skip mode information,
when the skip mode is valid, the predicted image generating part outputs the interpolation predicted image as the predicted image, such that the interpolation predicted image is used for compression of every pixel block to be encoded; and
when the skip mode is invalid, the predicted image generating part outputs the in-screen or between-screen predicted image as the predicted image, such that the in-screen and between-screen predicted image are encoded by being switched for every pixel.

* * * * *